June 15, 1954 B. M. OLIVER 2,681,385

REDUCTION OF SIGNAL REDUNDANCY

Filed June 29, 1950

2 Sheets-Sheet 1

INVENTOR
B. M. OLIVER
BY Hugh S. Wertz
ATTORNEY

June 15, 1954 B. M. OLIVER 2,681,385

REDUCTION OF SIGNAL REDUNDANCY

Filed June 29, 1950 2 Sheets-Sheet 2

INVENTOR
B. M. OLIVER
BY Hugh S. Wertz
ATTORNEY

Patented June 15, 1954

2,681,385

UNITED STATES PATENT OFFICE 2,681,385

REDUCTION OF SIGNAL REDUNDANCY

Bernard M. Oliver, Morristown, N. J., assignor to Bell Telephone Laboratories, Incorporated, New York, N. Y., a corporation of New York Application June 29, 1950, Serial No. 170,977

13 Claims. (Cl. 179—15.55)

This invention relates to transmission systems and, more particularly, to pulse transmission systems.

It has for some time been known that certain principles of statistical mechanics can be applied to communication theory. By the application of these principles, it can readily be shown that the normal present-day communication system employs a channel capacity greater than that required to send that amount of information which is actually necessary to describe the message. Most communication signals are not random, but exhibit a considerable degree of correlation—semantic, spatial (in television, for example), temporal, etc. Thus, a normal present-day communication system, employing a channel capacity that will suffice for the transmission of a completely random signal, is inefficient to the extent that the transmitted signals are correlated.

It is the primary object of the present invention to increase the efficiency of transmission systems now commonly in use for the communication of intelligence by reducing the redundancy in the signals which are transmitted.

It is another broad object of the present invention to reduce the channel capacity required of communication systems.

Similarly, it is a further object of the invention to lessen the average signal power required in a communication system, with no degradation of the message transmitted thereby.

It is still another object of the invention to reduce the frequency band width which is required to transmit a specified message.

In accordance with the invention and in furtherance of its various objects, the signal redundancy in wide band transmission is materially reduced by periodically sampling the message wave to be transmitted, by prediciting the succeeding value of the signal, by comparing this predicted value with the actual value, and then by transmitting only the difference, i. e., the error in prediction. At the receiver, the received error signal and a computed (i. e., predicted) signal equivalent to that at the transmitter are combined to yield a replica of the original signal. This technique relies for its effectiveness on the aforementioned correlation or interdependence which is found to exist in several forms in substantially all communication signals.

In one simple exemplary arrangement of the invention, the preceding signal sample is used as the predicted value, but, in a preferred embodiment, a weighted sum of several preceding signal values affords a more sophisticated prediction utilizing a larger portion of the signal correlation. In television, for example, these preceding signal values can, in accordance with the invention, be drawn not only from preceding elemental areas on the same line, but from prior lines and, in certain arrangements, from prior frames or fields as well. In all the embodiments, it is in accordance with the invention, although not necessary thereto, to quantize the signal sample amplitudes and to transmit pulses representative of these amplitudes, i. e., to employ those techniques which are familiar to the art as "pulse code modulation."

The invention will be more fully understood in the light of the following detailed description, taken in connection with the appended drawings, in which.

Figure 1:
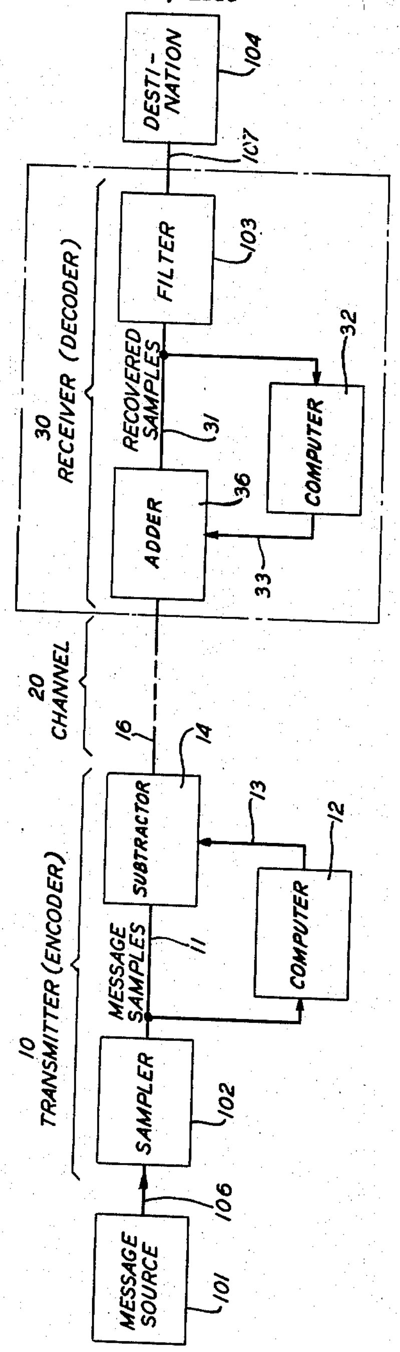
Fig. 1 is an over-all block diagram of a simple illustrative embodiment of the basic transmission system of the invention.

Before referring specifically to these figures, however, it will be of value to examine certain fundamental principles. It is to be noted that most of the signals which are encountered in communications (e. g., speech, music, television) may be limited to a definite frequency band without their being seriously distorted. Furthermore, it is readily demonstrable that if this frequency band extends from zero to a frequency $W_0$ cycles per second, then the signal, thus band-limited, can assume only $2W_0$ independent values per second. Accordingly, it can also be shown that the amplitude values obtained by sampling the signal at times uniformly spaced $$\frac{1}{2W_0}$$

seconds apart serve to specify the signal completely. It is common to speak of this spacing as a Nyquist interval.

It is also well known that, even if the original signal has a continuous amplitude range, it is not necessary to send the exact amplitude of each sample. The amplitude range may instead be divided into a number of steps, with each sample being sent as a pulse whose amplitude corresponds to the amplitude of the step nearest the exact sample amplitude. The effect of this technique of "quantizing the samples" is merely to add a more or less random noise to the signal as recovered at the receiver. If the number of steps is made sufficiently large, this noise is negligible.

It follows from the foregoing that in order to send a signal of duration T, it is necessary to send approximately $2W_0T$ numbers, each of which can have $b$ possible values, $b$ being a function of the closeness of the quantization employed. These values zero to $b$ can, for example, be represented in terms of a binary code, which is the underlying basis of most pulse code modulation (known generally as PCM) systems. Obviously, if $b \leq 2^n$, then each sample can be sent as a code group of $n$ bivalued pulses (most simply, on-off pulses).

PCM uses an $n$-fold increase in band width (to send $2nW_0$ pulses per second rather than $2W_0$) and in return therefor achieves the ability to transmit substantially without error in the presence of poor signal-to-noise ratios. This indicates the well-known fact that the required band width and signal-to-noise ratio (in decibels) are reciprocally related to each other. Thus, as an example of the converse situation, if it were desired to recover a signal with only a twenty decibels signal-to-noise ratio and the circuit were capable of a forty decibels signal-to-noise ratio, it would be a straightforward matter to reduce the channel band width to $$\frac{W_0}{2}$$

It can be shown, as a more general approach to the problem, that the capacity C of a channel (in binary digits per second) is given by $$C = W \log_2 \left(1 + \frac{P}{N}\right)$$

where W equals the channel band width, P equals the average signal power, and N equals the average noise power. This is an exchange equation. Thus, provided that C is kept constant, it is possible to vary W, P, and N and still transmit the same information at the same rate. It is readily demonstrable that, for two channels of equal capacity, it is approximately true (when $$\frac{P_1}{N_1} >> 1$$

and $$\frac{P_2}{N_2} >> 1)$$

that $$\log \frac{P_2}{N_2} = \frac{W_1}{W_2} \log \frac{P_1}{N_1}$$

where the subscripts indicate the respective channels. It is apparent from this equation that if no use is made of message correlation, a reduction of the band width by a factor $m$ requires roughly $m$ times the signal-to-noise ratio in decibels. Obviously, when the desired signal-to-noise ratio in the recovered signal is already high, this exchange relationship imposes an almost prohibitive signal-to-noise requirement on the channel for any appreciable saving in band width. In any given system, with a certain required channel capacity C, the optimum values of the variables W, P, and N are not then necessarily in the direction of minimum W. A typical pulse code modulation system is an example in point. The ideal approach to the problem is to reduce the required channel capacity C, and this can be done by sending only as much information as is actually necessary to describe the message. Thus, in accordance with the invention, as much redundancy as possible is removed from the message before it is transmitted, and then W, P, and N are apportioned in whatever way is most suitable for any particular communication system.

It has already been mentioned that the maximum number of independent values that a communication signal can assume per second is $2W_0$, where $W_0$ is the signal band width. But it is extremely unlikely that all of the samples of any communication signal actually will be independent, since the typical communication source is not such that the successive sample values are chosen at random out of a set of possible values. For purposes of illustration, however, it will be of interest to consider a signal source which produces $2W_0$ samples per second, each sample having $b$ possible values and each sample being chosen independently, with all of the $b$ possible values equally likely of occurrence. There is with such a source no way of determining what the next sample will be, even if all the history of the signal is known. To specify one out of $b$ possible values requires $\log_2 b$ binary digits (bits) and hence $\log_2 b$ "on-off" pulses. Thus, to send this signal, a channel capacity of $2W_0 \log_2 b$ bits/second is required. Most existing communication systems provide roughly this much capacity even though it is not needed for all typical signals. That is, although the signals put over communication systems are not random, present systems provide enough channel capacity to send a random noise (band limited to $W_0$) having a certain amplitude range. As has already been emphasized, the fact is that each successive sample of an ordinary signal is not independent of the previous samples, i. e., is not a choice of one of $b$ equally likely amplitudes. On the contrary, the previous history of the signal makes all but a few of the $b$ possible amplitudes for the next sample extremely unlikely.

It is thus feasible as well as economical to compute at each time what the next sample is most likely to be and then to send only the discrepancy between the prediction and the actual value of the sample. In the limit, therefore, only if the next sample contains something which could not be predicted (i. e., some new and independent information) will a signal be sent. Instead of sending the entire amplitude of a sample, it is in accordance with the invention to send only the mistakes in prediction, the amount, in a manner of speaking, by which each next sample surprises the system. It is obvious that if most of the sample values are susceptible of close prediction (which will be so if there is a large amount of correlation or redundancy in the signal) then the average $(\text{amplitude})^2$ of the mistakes will be correspondingly much less than the average $(\text{amplitude})^2$ of the original signal. That is, the power in the error signal will be much less than in the original signal. It can indeed be shown that if the computer (or predictor) makes full use of the past, then the power in the error signal will be the entropy power of the original signal, i. e., the power of a white (random) noise having the same entropy. The term "entropy" is here used in the sense employed by Shannon in his Mathematical Theory of Communication, volume 27, Bell System Technical Journal, pages 379–423 and 623–656, in which the thermodynamical (i. e., Gibbs' statistical-mechanical) concept of entropy as the unavailability or degree of randomness of energy is applied to communication theory by associating "information" with the amount of freedom of choice in the construction of a message and the corresponding a priori ignorance at the receiver as to the content of the message.

Thus, it is in accordance with the invention to send the message over a channel with the same band width as before, but with less average power, so that the required channel capacity is therefore reduced. Shannon, in his article mentioned above, has shown that the channel capacity C must be at least equal to the entropy rate, H', of the message source, where this entropy rate of the message source is the sampling frequency times the average uncertainty of the next symbol, assuming that all the past is known. In accordance with the invention, then, it is conceivable that the required channel capacity can be reduced as close to the lower theoretical limit as is desired.

The above-mentioned power saving is of direct importance in frequency division multiplex circuits, where the low probability of the simultaneous occurrence of high instantaneous powers in several channels (due to bad guesses by the predictors) indicates that the entire effective power level can be raised to give better transmission. On the other hand, in television, for example, the reduction in power can advantageously be traded for a band width reduction. Thus, it is in accordance with the invention to "remap" the error signal so as to provide a reduced band width, as will be discussed at a later point in the specification.

In Fig. 1, there is shown, in block schematic form, a simple illustrative arrangement of a communication system embodying the principles outlined above.

The message 106 from a message source 101 is applied to the transmitter 10, where it is operated on to yield a signal 16 from which much of the redundancy has been removed. If this message 106 is a continuous wave, the first stage of the transmitter is a sampler 102, which produces a series of message wave samples 11 (as pulses of different amplitude). In this transmitter, the samples are applied to a computer (or predictor) 12, which, in accordance with this illustrative embodiment of the invention, has a delay of one sampling period. At the output of this computer, there appears a series of predictions 13, each the predicted value of a sample, based on the values of one or more of the previous samples. Each of the predicted sample values 13 appears at the same instant that the true corresponding sample 11 is received. The two are compared in a subtractor 14, and the error 16, if any, is sent over the channel 20. At the receiver 30, an identical computer 32 makes the same predictions 33 as does the transmitter computer 12, based on the recovered message samples 31, which can for the present be assumed to be the same as the original message samples 11. Since this computer 32 will make the same mistakes as the computer 12 at the transmitter, when the output 33 of this computer is added to the received error 16 in adder circuit 36, the result is indeed the original sample.

If a continuous wave message is the desired output, these recovered samples 31 are fed to a filter circuit 103, which operates in accordance with established electronic techniques to yield a continuous wave 107 from the sample pulses. This continuous wave 107, which is obviously equivalent to the original message 106, is then applied to the message destination 104.

To illustrate how the system gets started, let it be assumed that there has been no message for a long time. In that case, everything is quiescent; both computers 12 and 32 are predicting zero for the next sample. When the first sample different from zero arrives, nothing is subtracted from it at the transmitter, and nothing is added at the receiver. Consequently, the sample appears at the output, both computers go to work on this sample, and the system is functioning.

If the computer really does remove all redundancy from the signal, however, certain other considerations are important. Since everything which is sent is then essential, if a hit occurs in the channel and one error-sample is disturbed, the computer 32 at the receiver is at a loss from then on. Although an output will continue to appear at the receiver, it might have no connection with what was sent. Such operation is manifestly intolerable. But if the redundancy is not entirely removed at the transmitter, it is, in general, true that the system can be so designed that the solution again converges to the proper one at the receiver. The frequency and magnitude of the disturbances in the channel thus set a limit to the amount of redundancy which can, in accordance with the invention, be removed. This is not, however, a serious limitation, since the use of pulse code modulation or some other such rugged system would permit 99 per cent or more of the redundancy to be safely removed.

Figure 2:
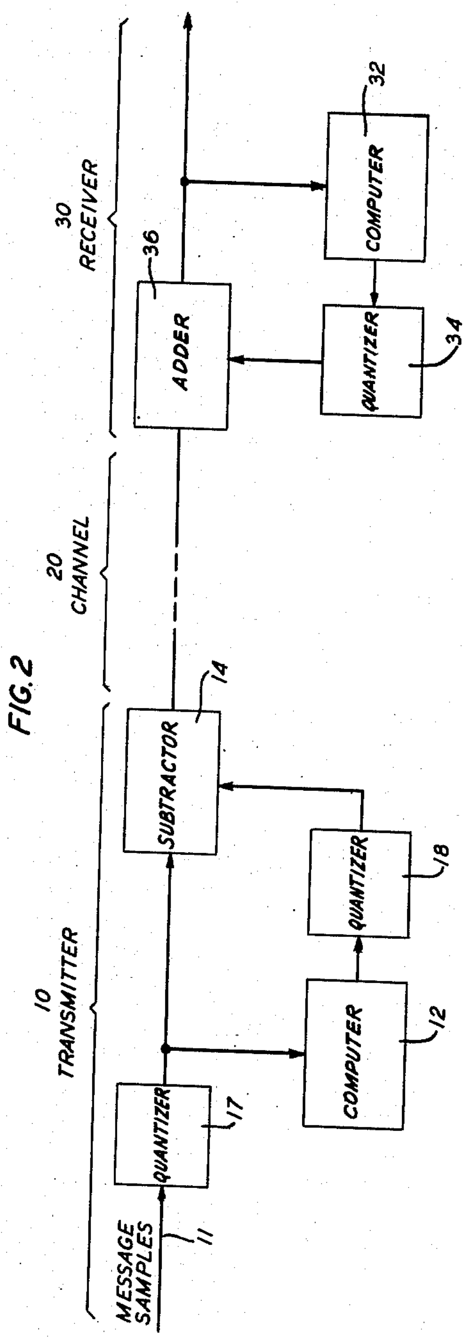
Fig. 2 is an over-all block diagram of an exemplary arrangement of the invention in which quantization is employed.

The use of a quantized transmission system (such as PCM) for the channel, in order to obtain rugged transmission, requires a modification of the system along the lines of the exemplary embodiment shown in Fig. 2. If the two computers are identical, then it is essential that they be supplied with identical inputs. If what is done is merely to quantize the output of the transmitter, this will not be the case. One solution, in accordance with the invention, is to employ quantizer 17 to quantize the input to the transmitter and also, to the same scale, to utilize quantizers 18 and 34, respectively, to quantize the outputs of computers 12 and 32, respectively. Since, at the transmitter, both inputs to the subtractor 14 are now quantized to the same step heights, the output will also be quantized to these same levels, and further quantization in the channel (i. e., regeneration), is all to the good. Furthermore, both computers are working on the same quantized series of samples.

Figure 3:
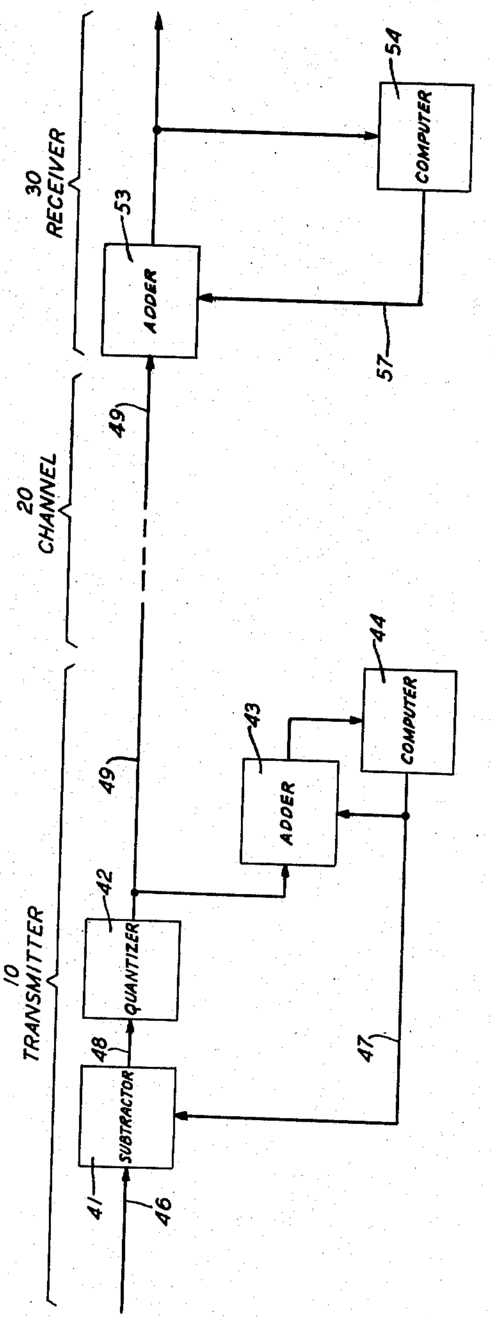
Fig. 3 is an over-all block diagram of another illustrative embodiment of the system which also employs quantization.

Another exemplary arrangement of considerable interest is illustrated in Fig. 3. In this illustrative embodiment, the receiver 30 is duplicated as part of the transmitter 10 and is fed from the same quantized signal 49 at both locations. At the transmitter, the message samples 46 are compared in subtractor 41 with the predicted values 47 furnished by computer 44, which, along with adder 43, is a duplicate of the adder 53 and computer 54 which constitute the receiver. The error signals 48 which result from this comparison are then quantized in quantizer 42, the quantized signals 49 being transmitted over the channel 20 to the receiver 30 where they are added in adder 53 to the signals 57 furnished by computer 54. This arrangement uses two fewer quantizers and one more adder than the exemplary embodiment illustrated in Fig. 2, which small difference in complexity is somewhat in its favor. The arrangement of Fig. 3 is preferable also in that it does not, as does that of Fig. 2, quantize both the true signal and the predicted signal before subtraction but quantizes only the result. It is apparent that quantizing both beforehand permits quantizing errors in the result anywhere from +S to −S, where S is the step height (i. e., the magnitude of a quantum), while in the embodiment wherein the continuous signals are first subtracted, the quantizing error is confined to the region between $$+\frac{S}{2} \text{ and } -\frac{S}{2}$$

All the elements shown in Figs. 1, 2, and 3, are, with the exception of the computers, well known in the art. For example, adders and subtractors can, in accordance with the invention, be simple resistance networks supplied with the proper polarity of signals. Similarly, it is in accordance with the invention to use quantizers of any of several types which are in common use. For example, in the Bell System Technical Journal, January 1948, pages 44 through 57 in an article entitled "Electron Beam Deflection Tube for Pulse Code Modulation" by R. W. Sears, there is described a coding tube which employs a quantizing grid and which is well adapted for quantizing. A PCM "flash coder" type of tube with the various digit inputs sliced and recombined with the proper attenuations is one example. Another technique which is in accordance with the invention is to use a ribbon beam gun structure, as in the flash coder tube, but with the code plate replaced by a staircase-shaped target. Similarly, any of the various feedback schemes which are common in PCM systems can be used, provided that the signal band width is not too great. Computers or predictors which are capable of serving the functions demanded by the invention are, however, not at all known in the art. Thus, a number of effective computer arrangements will be disclosed in this specification, but the details of such computers, which are inventions in themselves, are more fully disclosed in a copending application, viz., Serial No. 170,978, filed June 29, 1950.

A predictor can, in accordance with the invention, be either linear or non-linear, variant or invariant. It is linear if its prediction is a linear function (e. g., an algebraic sum) of the signal data which it receives. It is invariant if its method of prediction does not change with time or with the signal.

Figure 4:
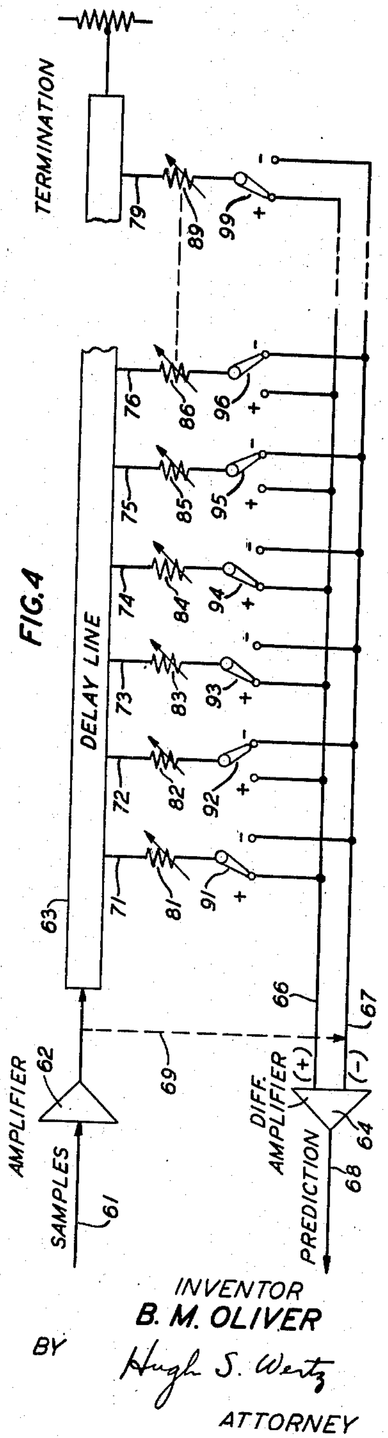
Fig. 4 is a schematic representation of an exemplary arrangement of a linear invariant predictor which can be used in the practice of the invention.

For purposes of illustration, there is shown in Fig. 4 an exemplary arrangement of a linear invariant predictor which can be used in the practice of the invention. This linear invariant predictor always gives a prediction which is the algebraic sum of the past samples, each multiplied by an appropriate coefficient. The signal samples 61 are passed into a delay line 63 and can, in accordance with the invention, be amplified in amplifier 62 before being fed into this delay line. The taps 71, 72, 73 . . . 79 on this delay line are separated by the interval between successive samples. Thus, if the sample to be predicted is just being applied to the line, the signal at tap 71 is the previous sample, the signal at tap 72 is the one before that, etc. Variable attenuators 81, 82, 83 . . . 89 determine, by their settings, the magnitude of the fractions, $|a_i|$, of the voltages appearing at the taps 71 to 79 which are to be added and applied to one or the other of the two inputs of a differential amplifier 64. This amplifier gives a positive output if a positive voltage is applied to its input 66, marked (+), and a negative output if a positive voltage is applied to its input 67, marked (−). The output is thus always proportional to the voltage difference on the two input leads 66 and 67 and hence the name "differential amplifier." Whether a voltage appears the the positive or the negative input of the differential amplifier is determined by the position of switches 91, 92, 93 . . . 99, respectively, through which the several attenuated tapped voltages are fed to the amplifier. It is obvious that the output 68 of the differential amplifier 64, i. e., the predicted value of the signal sample, can be represented algebraically as:

$$S_p = a_1S_1 + a_2S_2 + a_3S_3 + \ . \ . \ . \ + a_nS_n = \Sigma a_iS_i$$

where the subscripts correspond to the taps on the delay line and the magnitude of the coefficients ($a_i$) indicate the attenuator settings. The sign of these coefficients depends, of course, on which amplifier input, 66 or 67, is chosen.

It is apparent that by adding the full value of the present sample to the proper input of the differential amplifier 64, the output 68 may be made to consist of the errors in prediction rather than the prediction alone. The dotted connection 69 in Fig. 4 illustrates this arrangement. By this means, the subtractor 14 shown in Fig. 1 is effectively included in the computer 12 of that figure.

Just what particular variation of the predictor arrangement illustrated in Fig. 4 is most suited to a particular system is obviously a function of the signal statistics. In television, for example, elements which are neighboring but not on the same scanning line are highly correlated, and there is, of course, high correlation between corresponding elements in successive frames. In a more refined embodiment, therefore, the utilization of samples from a preceding line is made possible by the use of acoustic delay means to delay one line time, and in still another embodiment, storage tube delaying means are employed to permit the utilization of previous frame or field samples. These predictors are, however, inventions in and of themselves, and, consequently, their details are more fully disclosed in a copending application Serial No. 170,978, filed June 29, 1950.

As stated above, it is also within the practice of the invention to employ a variant or a non-linear predictor. In fact, non-linear encoding techniques are in many embodiments of the invention to be preferred to the extremely complex linear devices, which highly accurate linear invariant prediction would entail.

It is apparent that prediction is effectively a form of coding and that the predictor described above really performs a certain type of encoding or computing operation on the message.

In a copending application, Serial No. 170,979, filed June 29, 1950, there are disclosed several exemplary arrangements of a non-linear computing means which, while not a predicting device, operates in a manner which is of interest in connection with the present invention. This non-linear device is an encoding means in which a coded pulse is formed whose amplitude does not correspond directly with the signal sample amplitude but rather with the inverse of the probability of occurrence of the particular sample amplitude in its particular context. These probabilities are determined by collating a mass of statistical data, and the results are incorporated into the geometry of the encoding means. In a simplest embodiment, a so-called "monogrammer," the message samples are applied to the deflection plates of a cathode-ray tube so as to deflect the spot to a certain position on the fluorescent screen corresponding to a possible message sample amplitude. In front of the screen there is a mask having areas with different optical transmission factors, each transmission factor corresponding to a possible signal sample amplitude. The light transmitted by these areas as the spot follows behind them in succession is picked up by a photocell and constitutes the transmitted signal. A similar device at the receiver converts the probability-representative signal pulse amplitudes back into the original message sample amplitudes.

It is evident that the probable choices for the next sample are further limited by the previous sample amplitude. That is, if the previous sample amplitude is known, there may be only a few likely choices for the next amplitude. This is simply a manifestation of the correlation or independence discussed above. Thus, it is within the ambit of the invention to employ an encoding means similar to that described but extended into two dimensions. This co-called "digrammer," as well as trigram, tetragram, an in general $n$-gram structures, are, like the monogrammer, inventions per se and are disclosed in complete detail in the copending application referred to above, Serial No. 170,979, filed June 29, 1950.

Even though a good predictor can, in accordance with the invention, be made for a given signal, the problem remains of adapting to the channel the error signal which results. In television, for example, the error signal might consist of a sizeable number of small amplitude errors (plus or minus one or two quantizing steps and many errors of zero) and a few high amplitude errors. Evidently, whereas the average power in the error signal may be very much less than in the original signal, the peak power might be just as big. A recoding or remapping operation is therefore indicated in order to make the average power more nearly comparable to the peak power, but just how this can best be done depends upon the statistics of the error signal, i. e., the probability distribution of error amplitudes.

One feasible remapping technique which is within the scope of the invention is to "draw the line" at an error of $\pm g$ quantizing steps. Any error less than or equal to $g$ in amplitude is sent directly as a quantized pulse. Any error greater than $g$ is sent as a code group (preceded by an identifying pulse to indicate to the receiver that a code group is coming). Thus, to choose an illustrative value, a pulse amplitude modulation (PAM) signal having four or five quantizing steps would suffice for the whole signal, at a slight increase in band width. Alternatively, the signal can be converted to a two or three digit binary PCM, which is a considerable improvement over the six or seven digits required for direct transmission in accordance with the techniques now generally in use. In another embodiment, the base four or five PAM signal is remapped (taking the pulses in pairs) to a base 16 or 25 PAM signal at half the band width. This sort of multiple transmission remapping technique is well known in the art.

In the event that the error signal, or any digit of the code group representing the error signal, contains long runs of zeros, i. e., many successive samples of zero amplitude, it is in accordance with the invention to send in place of these a code group specifying the length of the run. The efficiency of this method is manifest with runs on the order of seven or eight or more samples but not fewer, since the specifying code group may take three or four pulses itself. The same method can be extended in the event that long runs of any amplitude are found in the error signal, but in this situation, it is necessary to send the sample height as well as the length of the run so that this system does not become efficient except with runs of a considerable length.

What is claimed is:

1. A transmission system comprising means supplied with a message wave for sampling said wave to derive thereby message samples, delay means supplied with said message samples for deriving a plurality of delayed message samples, each representing a sample preceding an instant sample and being delayed the time period by which it precedes the instant sample, means for combining the plurality of delayed samples in accordance with the statistics of the message wave to derive a predicted value, means for subtracting the predicted value from the instant sample and deriving an error signal, means for transmitting said error signal to a receiving station, and means at said receiving station for utilizing said error signal to reconstruct a facsimile of the message wave.

2. A transmitting system comprising means supplied with signal information for deriving message samples, means for quantizing said message samples to derive thereby quantized samples, delay means supplied with said quantized samples for deriving a plurality of delayed quantized samples, each sample of said plurality representing a sample preceding an instant sample and being delayed the time period it precedes the instant sample, means for combining the plurality of delayed samples in accordance with the statistics of the signal information to derive a predicted value, means for quantizing said predicted value and deriving a quantized predicted value, means for subtracting the quantized predicted value from the instant quantized sample and deriving an error signal, means for transmitting said error signal to a receiving station, and means at said receiving station for utilizing said error signal to reconstruct a facsimile of the signal information.

3. A transmitting system comprising means supplied with signal information for deriving message samples, subtracting means supplied with said message samples, means for quantizing the output of said subtracting means to derive thereby a quantized error signal, adding means supplied with said quantized error signal, delay means supplied with an output of said adding means for providing a plurality of delayed signals each of said plurality being delayed by the time by which it precedes the instant signal, means for combining said delayed signals in accordance with the statistics of the signal information and deriving a predicted value, means for supplying this predicted value for utilization therein to said adding means and to said subtracting means, means for transmitting the quantized error signal to a receiving station, and means at said receiving station utilizing said transmitted signal for reconstructing a facsimile of the signal information.

4. A transmission system comprising means supplied with signal information for sampling said information at periodic sampling intervals to thereby derive message samples, predicting means supplied with said message samples for utilizing said samples to obtain a predicted value, means for subtracting said predicted value from an instant sample to obtain an error signal, and means for transmitting said error signal for utilization, and characterized in that the predicting means includes delay means supplied with message samples for deriving therefrom a plurality of delayed samples each representing a sample preceding the instant sample and being delayed by the time by which it precedes the instant sample, weighting means supplied with said delayed samples and having circuit constants predetermined in accordance with the statistics of the signal information, and means for combining the weighted samples to provide a predicted value.

5. A transmission system according to claim 4 in which the signal information is a television signal and in which the sampling interval is substantially the time interval $\frac{1}{2}W_0$ where $W_0$ is the band width of the signal information.

6. A transmission system according to claim 4 in which the signal information is a television signal, the sampling interval is substantially the time interval $\frac{1}{2}W_0$ where $W_0$ is the band width of the signal information, and the delayed samples include the immediately preceding sample.

7. A transmission system according to claim 4 in which the signal information is a television signal, the sampling interval is substantially the time interval $\frac{1}{2}W_0$ where $W_0$ is the band width of the signal information, and the delayed samples include the immediately preceding sample and a sample of the immediately preceding scanning line.

8. A transmission system according to claim 4 in which the signal information is a television signal, the sampling interval is substantially the time interval $\frac{1}{2}W_0$ where $W_0$ is the band width of the signal information, and the delayed samples include the immediately preceding sample, a sample of the immediately preceding scanning line and a sample of the immediately preceding field.

9. A transmission system comprising means supplied with a television wave for sampling said wave at periodic sampling intervals to derive a plurality of wave samples, a delay means supplied the plurality of wave samples for delaying each sample of the plurality one sampling interval, means for comparing each instant sample with its immediately preceding sample provided by the delay means and deriving a difference signal, and means for transmitting each difference signal to a receiving point for utilization in the reconstruction of the television wave.

10. A transmission system according to claim 9 in which the sampling interval is substantially the time interval $\frac{1}{2}W_0$ where $W_0$ is the band width of the television wave.

11. A transmission system comprising means supplied with a television wave for sampling said wave at periodic sampling intervals to derive a plurality of wave samples, a predicting means supplied with the wave samples for utilizing the wave samples to provide a predicted value, means for subtracting said predicted value from each instant sample to obtain an error signal for utilization, and characterized in that the predicting means includes a delay means supplied with the wave samples for providing samples corresponding to picture elements having a close space-time proximity to the picture element represented by an instant sample, weighting means supplied with said delayed samples for weighting each delayed sample in accordance with the time-space proximity of its corresponding picture element to that of the instant sample, and means for combining the weighted samples to obtain the predicted value.

12. A transmission system according to claim 11 in which the samples provided from said delay means for weighting by the weighting means include at least one sample corresponding to a picture element in the same scanning line as the picture element represented by the instant sample and at least one sample corresponding to a picture element in a different scanning line as that of the picture element represented by the instant sample.

13. A transmission system according to claim 11 in which the samples provided from said delay means for weighting by the weighting means include at least one sample corresponding to a picture element in the same scanning field as the picture element represented by the instant sample and at least one sample corresponding to a picture element in a different scanning field as that of the picture element represented by the instant sample.

References Cited in the file of this patent

UNITED STATES PATENTS

| Number | Name | Date |
|---|---|---|
| 2,508,622 | Pierce | May 23, 1950 |
| 2,510,054 | Alexander et al. | June 6, 1950 |
| 2,516,587 | Patterson | July 25, 1950 |

OTHER REFERENCES

The Bell System Technical Journal, April 1950, pages 147–160.